(No Model.) 2 Sheets—Sheet 2.

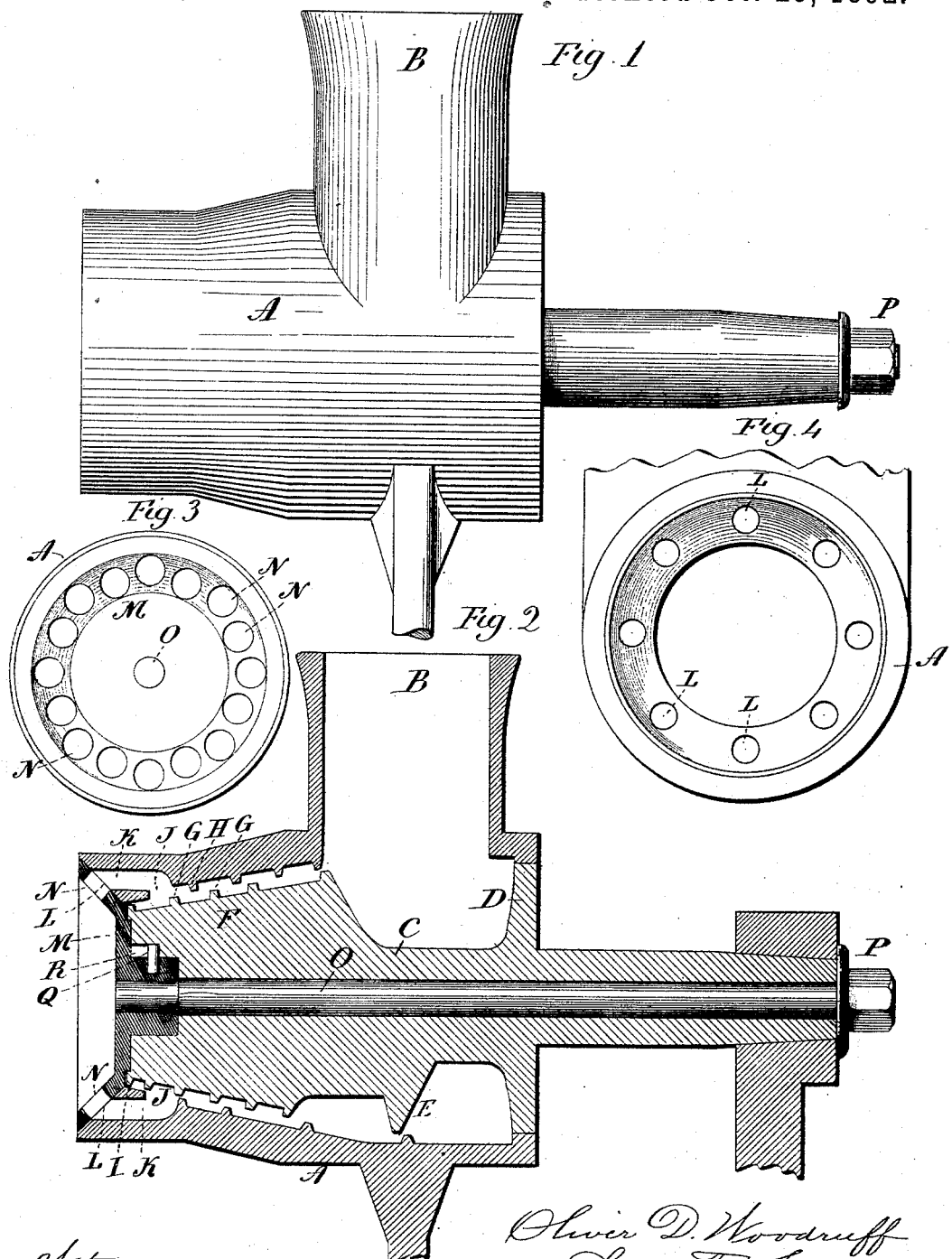

O. D. WOODRUFF & L. T. SNOW.
MEAT CUTTER.

No. 484,988. Patented Oct. 25, 1892.

United States Patent Office.

OLIVER D. WOODRUFF, OF SOUTHINGTON, AND LEVI T. SNOW, OF NEW HAVEN, CONNECTICUT.

MEAT-CUTTER.

SPECIFICATION forming part of Letters Patent No. 484,988, dated October 25, 1892.

Application filed June 6, 1892. Serial No. 435,707. (No model.)

*To all whom it may concern:*

Be it known that we, OLIVER D. WOODRUFF, of Southington, county of Hartford, and LEVI T. SNOW, of New Haven, in the county of New Haven, State of Connecticut, have invented a new Improvement in Meat-Cutters; and we do hereby declare the following, when taken in connection with accompanying drawings and the letters of reference marked thereon, to be a full, clear, and exact description of the same, and which said drawings constitute part of this specification, and represent, in—

Figure 5:
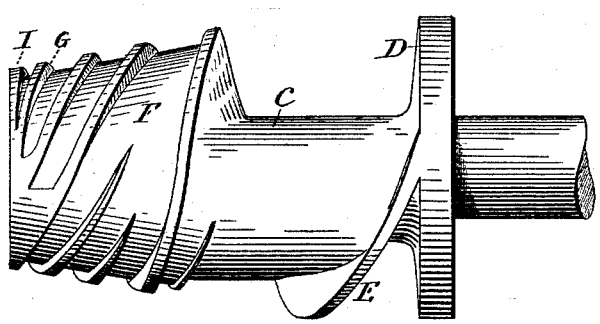
Figure 6:
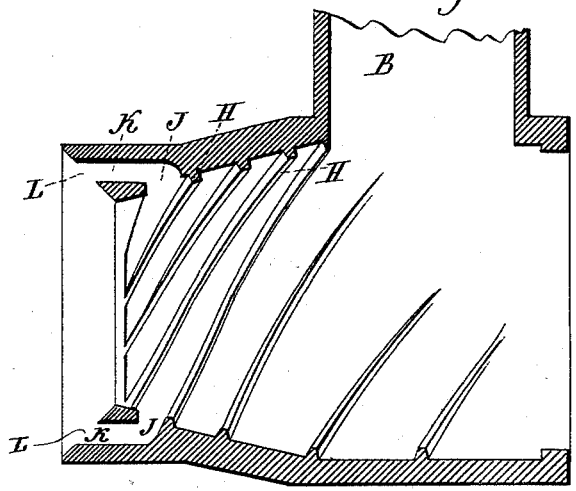
Figure 7:
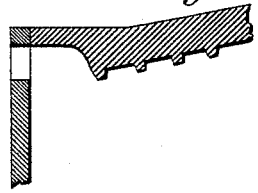

Figure 1, a side view of the machine; Fig. 2, a longitudinal central section; Fig. 3, a delivery-end view; Fig. 4, a delivery-end view of the case with the perforated plate removed; Fig. 5, a side view of the follower detached; Fig. 6, a longitudinal section of the case, the follower removed; Fig. 7, a modification.

This invention relates to an improvement in that class of meat-cutters which consist of a case having a hopper at one end, through which the meat may be introduced, a follower arranged to revolve upon a longitudinal axis within the case, the follower having a spiral blade which will force the meat introduced through the hopper along through the case, the interior of the case and the periphery of the follower from the hopper toward the other end of the case of corresponding shape, and the surface of each provided with spiral ribs which coact to cut the meat as it is forced through between that part of the follower and the case and delivered through perforations at the end of the case opposite the hopper, and which perforations produce a supplemental and final cutting of the meat as it is delivered from the machine, the object of the invention being a simple construction whereby the machine is made in few parts, readily cleaned, and very effective in its work; and it consists in the construction as hereinafter described, and particularly recited in the claims.

A represents the case; B, the hopper. That portion of the case immediately below the hopper is of cylindrical shape; but from the hopper forward toward the delivery end of the case the interior of the case preferably gradually contracts in diameter, producing a conical shape. Upon a longitudinal axis within the case the follower C is arranged, which consists of an arbor extending through the hopper end of the case, to which power may be applied in the usual manner. On the follower is a collar D, which is adapted to close the hopper end of the case, that end of the case being left open for the withdrawal of the follower. The hopper is provided with the usual spiral blade E, so that the meat which is introduced through the hopper will be forced forward by the revolution of the follower and blade E. That portion F of the follower within the case forward of the hopper is of conical shape, corresponding to the internal shape of the case, and this part of the follower is constructed with a series of spiral ribs G, and the case is constructed with corresponding spiral ribs H, the ribs G and H being adapted to coact so as to cut the meat as it is forced through between the follower and the case. The delivery end I of the follower is of a diameter corresponding to the delivery end of the case and so as to substantially fill the case at that point, as seen in Fig. 2. From the case inside the end I of the follower openings J are made, more or less in number, and which openings lead into passages K, which open through the end of the case, as at L. (See Figs. 2 and 4.) Consequently the meat which is cut by its passage between the revolving follower and the case will be forced through the openings J into the passages K and thence escape through the openings L in the end of the case. A disk M is attached to the end of the follower and extends over the openings L in the end of the case, and this disk is constructed with a series of perforations N, (see Fig. 3,) which are adapted under the revolution of the disk to work across the openings L of the case and so that the meat which passes through the openings L will enter the perforations N in the disk, and because of the revolution of that disk that portion of the meat which passes into the perforations in the disk will be cut as those perforations pass the openings in the case, and thus produce a supplemental cutting of the meat as it is delivered from the machine. The disk is fixed to a shaft O, which extends longitudinally through the follower, and at its opposite end the shaft O is provided with a nut P, so that when the crank, or whatever the power may be, is applied to the end of the arbor the nut on the shaft O will bear against the end of the arbor, tending to draw the follower and perforated disk together and to proper bearings in the case, as clearly seen in Fig. 2. The force thus applied to the nut tends to draw the follower and disk together, so adjusts the disk and follower with relation to their respective cutting-surfaces—that is to say, it will tend to draw the follower forward to bring its cutters into closer contact with the corresponding cutters of the case and also to draw the disk M into closer contact with the surface upon which it works. The disk is engaged with the follower, so as to positively revolve therewith. This engagement is produced by means of a stud Q on the hub of the disk, which sets into a corresponding notch R in the end of the follower.

Preferably that portion of the disk in which the perforations are made is of conical shape and the end of the case is correspondingly recessed, as clearly seen in Fig. 2; but other forms may be employed—as, for illustration, a plain flat surface between the disk and case, as seen in Fig. 7.

The spiral cutting-ribs of the case, as well as the spiral ribs of the follower, should be fitted with considerable nicety and present sharp angles to each other, in order to give a shear-like cut to the meat as it passes between the ribs on the two parts.

While preferring to make the openings J into passages which lead through openings in the end of the case, these escape-passages may be in the form of grooves made in the end of the case, as seen in Fig. 7, it only being necessary that there shall be escape-passages from the cylinder near its delivery end corresponding to the working surface of the disk. By this construction the supplemental cutting is produced by the arrangement of the revolving supplemental cutters outside the case, so that no space for the supplemental cutters is required inside the case. The result of this is a more positive cutting and less of a grinding character than can be produced where the supplemental cutters are arranged inside a stationary perforated plate. Again, by this arrangement of the supplemental cutters, the preliminarily-cut meat will all be forced through the case, so that but a trifling amount of meat is left within the case when the work is complete. The parts are easily separated and readily cleaned, there are no small parts liable to loss in the cleaning or adjusting of the machine, and the simple character of the machine makes it extremely durable.

We claim—

1. In a meat-cutter, the combination of a casing having a hopper at one end, the opposite end open, the interior of the case provided with a series of spiral cutting-ribs from the hopper toward the delivery end, a follower arranged to revolve upon a longitudinal axis within the case, the follower having a spiral blade adapted to force the meat from the hopper forward within the case, and that portion of the follower from the hopper forward corresponding in shape to the interior of the case and provided on its surface with series of cutting-ribs adapted to coact with the corresponding ribs within the case, the follower at the delivery end of a diameter substantially the same as the internal diameter of the case, passages leading from the interior of the case from a point back of the delivery end forward and outward, and a disk upon the end of the follower and adapted to revolve therewith, the disk constructed with perforations arranged to work across the outer end of the said passages, which open from the case, and thereby produce a supplemental cutting, substantially as described.

2. In a meat-cutter, the combination of a case having a hopper at one end for the introduction of meat, the case open at both ends and contracting in diameter from the hopper forward toward the delivery end, that portion of the case between the hopper and the delivery end constructed upon its inside with a series of spiral cutting-ribs, combined with a follower arranged to revolve within the case and constructed with a head to close the hopper end of the case and with a spiral blade at that end to operate as a forcer for the meat within the case, and that portion of the follower from the hopper forward contracted corresponding to the interior of the case and provided upon its periphery with spiral cutting-ribs adapted to coact with the spiral cutting-ribs within that portion of the case, the follower at the delivery end of the machine of a diameter to substantially close that end, the case constructed with passages leading from its interior in rear of said closed delivery end outward, and a disk on the delivery end of the follower and so as to revolve therewith, the disk perforated, its perforations being adapted to work across the outer end of said passages, substantially as described.

3. In a meat-cutter, the combination of a case having a hopper at one end for the introduction of meat, the case constructed upon its inside from the hopper forward toward the delivery end with spiral cutting-ribs, and a follower constructed with a spiral blade to operate to force the meat forward from the hopper, the surface of the follower from the hopper toward the delivery end of a shape corresponding to the interior shape of the case and constructed with spiral cutting-ribs adapted to coact with the cutting-ribs within the case, the end of the follower adapted to close the delivery end of the case, the case constructed with openings J in rear of the said delivery end and with passages K, leading from the said openings, the said passages terminating in openings L in the end of the case, with a disk on the end of said follower and so as to revolve therewith, constructed with perforations N, adapted to work across the said openings L in the end of the case, substantially as and for the purpose described.

4. In a meat-cutter, a case having a hopper at one end for the introduction of meat, and a follower arranged upon a longitudinal axis within the case and so as to revolve therein, the follower constructed with a spiral blade to force the meat forward, the periphery of the follower and the corresponding surface of the case between the hopper and the delivery end constructed with spiral cutting-ribs, combined with a conical disk on the end of the follower and adapted to revolve therewith, the case constructed with a conical bearing-surface for said disk and with passages leading from its interior in rear of its delivery end to the inner surface of said conical disk, the disk constructed with perforations which under the revolution of the disk will work across the outer ends of said passages, substantially as described.

In testimony whereof we have signed this specification in the presence of two subscribing witnesses.

OLIVER D. WOODRUFF.
LEVI T. SNOW.

Witnesses:
   G. D. SEYMOUR,
   FRED C. EARL.